United States Patent [19]

Anderson et al.

[11] Patent Number: 5,655,702

[45] Date of Patent: Aug. 12, 1997

[54] SACRIFICIAL BONDING AND FORMING AID FOR PLATELET ASSEMBLIES

[75] Inventors: Brad J. Anderson, Cameron Park; William A. Hayes, Wilton, both of Calif.

[73] Assignee: Aerojet-General Corporation, Sacramento, Calif.

[21] Appl. No.: 424,693

[22] Filed: Apr. 19, 1995

[51] Int. Cl.⁶ .................... B23K 20/02; B23K 31/00
[52] U.S. Cl. .................... 228/159; 228/174; 228/190; 228/193
[58] Field of Search .................... 228/190, 159, 228/163, 174, 193

[56] References Cited

U.S. PATENT DOCUMENTS

| | | |
|---|---|---|
| 3,413,704 | 12/1968 | Addoms, Jr. et al. . |
| 3,419,951 | 1/1969 | Carlson .................... 228/159 |
| 3,711,936 | 1/1973 | Athey et al. .................... 228/193 |
| 3,735,476 | 5/1973 | Derigas .................... 228/107 |
| 3,881,701 | 5/1975 | Schoenman et al. . |
| 3,914,348 | 10/1975 | Kors et al. . |
| 4,065,046 | 12/1977 | Roberts et al. .................... 228/193 |
| 4,395,303 | 7/1983 | Weir .................... 228/159 |
| 4,434,930 | 3/1984 | Trenkler et al. . |
| 4,526,312 | 7/1985 | Goss et al. . |
| 5,070,607 | 12/1991 | Boardman et al. . |
| 5,143,276 | 9/1992 | Mansbridge et al. . |
| 5,204,161 | 4/1993 | Pettit et al. . |
| 5,205,467 | 4/1993 | Sarkisian et al. .................... 228/190 |
| 5,226,578 | 7/1993 | Douglas . |
| 5,240,376 | 8/1993 | Velicki . |

Primary Examiner—P. Austin Bradley
Assistant Examiner—Jeffrey T. Knapp
Attorney, Agent, or Firm—Townsend and Townssend and Crew LLP

[57] ABSTRACT

Platelet assemblies are formed from bondable platelets, such as diffusion-bondable, brazable, or adhesive-bondable platelets, with void regions in the platelets to form channels or open spaces in the finished platelet assembly. To improve the response of the platelet assembly to pressure bonding as well as to post-bonding fabrication processes such as forming, machining and welding, the void regions are filled with a sacrificial material which transmits the load of the applied pressure in the same manner as the remainder of the platelet, and yet which is removable from the finished platelet assembly by either thermal or chemical liquefaction after all potentially damaging fabrication procedures have been performed on the platelet assembly.

13 Claims, 4 Drawing Sheets

PRIOR ART

SACRIFICIAL BONDING AND FORMING AID FOR PLATELET ASSEMBLIES

This invention resides in the field of bonded platelet assemblies for use as precision-engineered fluid flow conduits, and of the manufacture of these assemblies.

BACKGROUND OF THE INVENTION

Bonded platelet assemblies are used in the manufacture of certain types of components where thin walls with minute and precisely engineered flow passages in complex patterns or where thin walls with complex internal supporting structures are needed. Examples of components of this type are certain heat exchangers, aircraft panels, components for turbine machines, and rocket engines.

The platelets are fabricated from thin sheets of metal, and the assemblies are formed by fusing together a multitude of platelets along their broad faces. The flow passages are formed by through-passages or surface recesses in the individual platelets, with the passages or recesses in adjacent platelets superimposed to achieve the desired flowpath or network of flowpaths through the assembly. These passages or recesses can be formed in a variety of ways, one of the most prominent of which is photochemical machining, or "photoetching." Photoetching to form through-passages which penetrate the thickness of a platelet is commonly termed "through etching" while photoetching to form a recess in one side of the platelet without fully penetrating the platelet is commonly termed "depth etching."

Platelets can be fused together in a variety of ways. Examples are diffusion bonding, roll bonding, and brazing. Diffusion bonding is a particularly effective method, and consists of hot-pressing the platelets together at pressures typically below the yield point of the platelet material and temperatures typically in the range of 50% to 75% of the melting temperature of the platelet material (as measured from room temperature). The etched portions of individual platelets form void regions in the assembly, however, and the bonding pressure will not be transmitted through the assembly at the locations of these void regions. Platelet areas above or below these regions (considering the assembly as a stack of platelets arranged horizontally) will not receive the same pressure as adjacent platelet areas where these voids are not present. The result is nonuniform and perhaps insufficient bonding between platelets. This can cause distortion of the resulting flow passages and deviations from the intended precision of these passages.

Voids in the assembly also interfere with fabrication processes applied to the assembly subsequent to the fusion of the platelets. Many applications and uses of platelet assemblies require the assemblies to be either formed (distorted to a bent or curved shape), machined or welded to other parts. The bending or curving of a platelet assembly can cause buckling of one or more platelets in regions adjacent to voids in an adjacent platelet on the convex side of the bend. In machining operations, the force exerted by a machine tool on platelet regions adjacent to voids will distort those platelets since they lack the support of underlying platelets in those regions. In a welding operation on a region of a platelet assembly above a void, the heat of the welding tool will not dissipate through the assembly at the same rate since the void will not transmit the heat as quickly as the platelet material. The result is overheating and distortion, if not destruction, of the platelet.

Temporary fillers such as wax and certain polymers have been proposed for placement in the void regions after the diffusion bonding. These fillers are removable during processing of the assembly or upon application of heat since they readily melt or volatilize. While these fillers provide some support for smaller voids during forming or machining, they are of little use however for larger voids since they do not prevent bucking or distortion by a machine tool and are not capable of withstanding welding temperatures. In addition, platelet support is not sustained through the bonding process since the filler material melts at the bond temperature.

SUMMARY OF THE INVENTION

These and other problems encountered in the prior art are addressed by the present invention, which resides in the insertion of a solid but liquefiable metallic filler material in void regions of individual platelets, bonding the platelets together by applying pressure and optionally heat, depending on the bonding method, with the filler in place and in solid form, then liquefying the filler and removing it from the platelet assembly to leave a fully bonded platelet assembly with open internal chambers or passages. The filler material remains solid throughout the platelet bonding process but differs from the platelet material in terms of its composition which permits the filler material to be selectively liquefied. The filler may be placed in all void regions of the platelets, or only in those void regions which are large enough to raise a risk of incomplete bonding by incomplete or insufficient transfer of the pressure load. Thus, minute passages having widths in the micron range have a lesser need to be filled by the filler material during platelet bonding, whereas the need and beneficial effect of the invention are considerably greater in passages or chambers having widths on the order of millimeters or greater. The metallic filler material may be a metal, a metal alloy or other material in which metal is the major component and which has the characteristics of metal. The term "solid" is used herein to differentiate from "semi-solid" and from any other physical state which is less than fully solid.

This invention is of particular interest in the formation of platelet assemblies which are bonded together by diffusion bonding, but is also applicable to platelet assemblies which are bonded together by other means, such as brazing, adhesives, and combinations of diffusion bonding with brazing or adhesives. For convenience, most of the discussion which follows is directed to the diffusion bonding embodiment of the invention.

In accordance with a preferred aspect or implementation of this invention, the platelet assembly is formed by diffusion bonding, and the filler material undergoes diffusion bonding as part of the assembly. The filler and the platelets are of different materials, however, to permit selective removal of the filler material from the fused assembly by chemical means once all forming and fabrication processes are completed. Removal is achieved by melting or dissolving of the filler material and thereby converting it to a liquid form which is readily removed from the assembly. For embodiments of the invention in which liquefaction is achieved by melting, the filler material is one which melts at a temperature substantially above the temperature required for bonding of the platelets together but still below the melting temperature of the platelets themselves. The filler material will then remain solid throughout the bonding process and then melt when exposed to a higher temperature (without the elevated pressure used in the bonding process) while the platelets remain solid. For liquefaction by chemical means, examples are etching and leaching. A preferred chemical means is acid etching. Both thermal and chemical means of liquefaction are applicable to platelet assemblies bonded together by all of the methods referred to herein. The filler material in all such cases serves as a sacrificial bonding and fabrication aid.

The solid filler material provides lateral securement between adjacent platelets at the filled regions to accommodate shear forces between the platelets. This permits forming and machining to be done on the platelet assembly without buckling, separation or other distortion in platelet regions adjacent to the filled regions. In addition, the heat transmission properties of the filler material permit welding to be done on platelet material adjacent to the regions which will ultimately be void regions without fear of localized overheating.

Other features, objects and advantages of the invention will become apparent from the description which follows.

DETAILED DESCRIPTION OF THE INVENTION AND PREFERRED EMBODIMENTS

Figure 1:
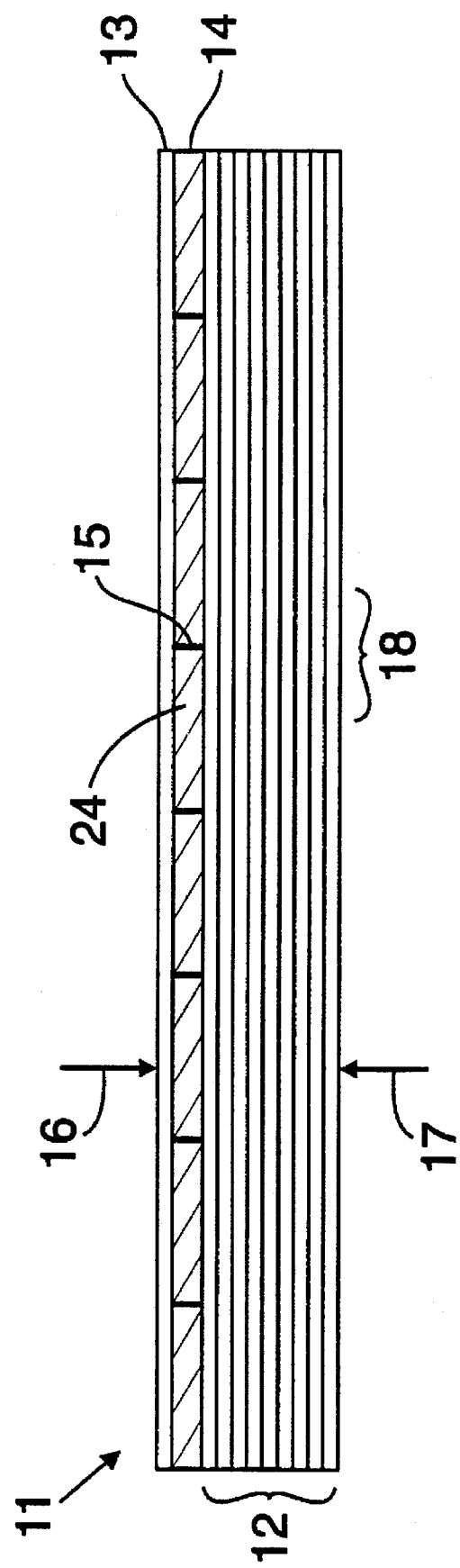
FIG. 1 is a cross section of a platelet assembly in accordance with the present invention.

Platelet assemblies can be formed from a wide variety of bondable metals and metal alloys. Examples are:

copper alloys: OFHC, ZrCU, NARLOY Z®, GLID COP®

Inconel (nickel-chromium alloys): 600, 625, 718 nickel alloys: 200 series alloys molybdenum aluminum alloys: 1100, 3000, 5000, 6061 titanium and titanium alloys: CP (chemically pure), 6A14V, 15-3.3.3, Beta 21-S stainless steels: 347, 304L, 316 platinum, platinum-iridium alloys and platinum-rhodium alloys

Conditions for bonding of platelets made from these materials will vary with the materials, but are known among those skilled in the art. Diffusion bonding is the metallurgical joining of complementary surfaces of two metal workpieces by applying heat and pressure for a sufficient time to cause atoms from one workpiece at locations near its surface to migrate into the other workpiece. Although the heat applied during the diffusion bonding process raises the temperature of the workpieces above the half-way level between room temperature and the base metal melting points of the workpieces, the temperature is held below the melting points thereby causing the procedure to be conducted in the solid state.

Brazing is the welding of two platelets together through a non-ferrous brazing metal or alloy which has a melting point lower than that of the platelet material. Examples of brazing metals and alloys are copper, copper-zinc, copper-phosphorus, silver-copper, gold, nickel, cobalt, aluminum-silicon, and magnesium-aluminum. The temperature and pressure conditions at which brazing is performed, and the selection of optimal brazing metals and alloys for particular platelet materials are known to those skilled in the art.

For embodiments of the invention in which adhesives are used to bond the platelets together, any of the wide variety of adhesives for metals can be used. Examples are epoxy resins, phenolic resins, acrylics, polyimides, polyphenylquinoxalines, and polyurethanes. Again, the methods of applying the adhesives to the platelet surfaces, the temperatures and pressure at which the adhesives are cured once the platelets are stacked, and the optimal choice of adhesive for particular platelet materials are known to those skilled in the art.

While the optimal pressures for bonding of the platelets will vary depending on the type of bonding, the bonding pressure for best results in most applications will usually be about 200 psi (1.4 MPa), preferably about 500 psi (3.4 MPa) or above, and most preferably from about 1000 psi to about 3000 psi (7 to 21 MPa). Optimal temperatures will vary similarly, although best results in most applications will generally be about 400° C. or above, and preferably about 400° C. to about 600° C.

The selection of pairs of metals to serve as the platelet material and the filler material will be based on the type of liquefaction used in the filler material removal step. For chemical liquefaction, the filler material will be one which will can be leached or etched without substantial leaching or etching of platelet material. In this specification, the term "platelet material" is used to designate the material which is intended to remain as part of the final platelet assembly after the filler material is removed. Since the actions of specific leaching or etching agents on specific metals are known, the selection of an appropriate combination of two metals and a leaching or etching agent is readily made. Examples of pairs of metals which will can be diffusion bonded and yet exhibit preferential or selective removal of one relative to the other are:

stainless steel as the platelet material and copper as the filler material, stainless steel as the platelet material and a nickel 200 alloy as the filler material, and titanium as the platelet material and stainless steel or nickel as the filler material.

Examples of leaching agents for acid leaching are dilute sulfuric acid, hydrochloric acid and nitric acids. For certain metals, primarily those involving aluminum as a filler material, alkaline leaching may be used. Alternatively, leaching may be performed by forming water-soluble complexes of the metal, using ammonia as a complexing agent. This is applicable to certain forms of copper, gold and nickel. For etching, conventional etching agents are nitric acid for zinc, copper and magnesium, ferric chloride for copper, caustic soda or phosphoric acid for aluminum, and hydrofluoric acid for various metals.

Leaching or etching may be accomplished by simple contact with the leaching or etching agent in liquid form, preferably an aqueous solution at ambient temperature. Agitation of the solution will accelerate the action of the agent and the removal of the filler from the platelet assembly.

Turning now to the drawings, FIG. 1 is a cross section view of a platelet assembly 11 ready for diffusion bonding and filler removal in accordance with the present invention.

The assembly is formed from eleven platelets, the bottom nine 12 and the topmost 13 of which are continuous with minute, precise flow passages (not shown in the Figure), while the second from the top 14 contains relatively large, regularly spaced void regions separated by thin strips of platelet material 15. Each of these relatively large void regions is a through-etched region extending through the full thickness of the second platelet 14.

To effect diffusion bonding of the platelet assembly 11, pressure is applied in the directions indicated by the arrows 16, 17 in a uniform manner over the entire top and bottom surfaces of the assembly, at elevated temperature. In procedures of the prior art, the void regions in the second platelet are occupied by air or an inert gas, and the segments 18 of the assembly which are in vertical alignment with the void regions will be subject to a substantially reduced compressive force since the void regions will not transfer the load. Diffusion bonding may occur in these discontinuous segments 18 as it does in the adjacent narrow segments below the solid strips 15 in the second platelet, but the strength of the bond in these discontinuous segments may be less since the bond itself may not be continuous.

Figure 2:
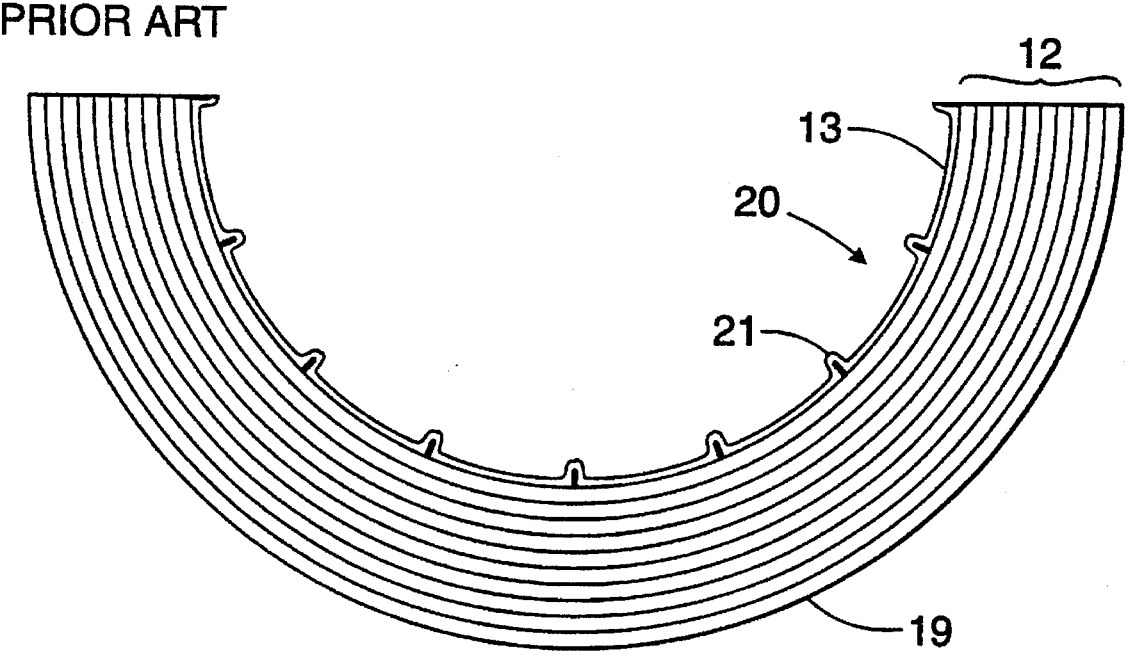
FIG. 2 is a cross section of a platelet assembly of the prior art after having undergone a forming process.

Even if diffusion bonding does occur throughout the platelet assembly, problems arise upon forming of the assembly into an arcuate contour as shown in FIG. 2. During the forming process, the lowermost platelet 19 experiences an elongation or stretching force, while the uppermost platelet 13 experiences a compressive force along the platelet surface, with the intermediate platelets experiencing forces of graduated magnitudes. The lowermost platelet 19 is forced to conform to the contour due to its continuous diffusion bond with the platelets adjacent to it. The uppermost platelet 13, however, becomes distorted in shape in the regions where it is not bonded to the underlying platelets. Thus, rather than compress, the platelet collapses into the void regions between the platelet strips 15 of the second platelet, forming valleys 20 in the concave surface of the formed assembly, separated by ridges 21 extending up and over the platelet strips 15 of the underlying platelet.

In accordance with the present invention and returning to FIG. 1, the void regions in the second platelet are filled with a filler or sacrificial bonding aid 24. This material is substantially no more compressible than the material of the nine lower platelets 12 and one upper platelet 13. As a result, when the pressure indicated by the arrows 16, 17 is applied, the pressure is fully transmitted to all platelets in the assembly to a uniform degree across the length and width (i.e., the surface area) of the assembly. Diffusion bonding occurs in a continuous and uniform manner along the surface area of each platelet. The filler material bonds to the platelet material at interfaces between the two as the platelet material bonds to itself in the remaining regions of the assembly. The bonding thus includes continuous diffusion bonding between the top platelet 13 and the second platelet 14 and between the second platelet 14 and the platelet directly underneath, as well as between the platelets 12 below the second platelet.

Figure 3:
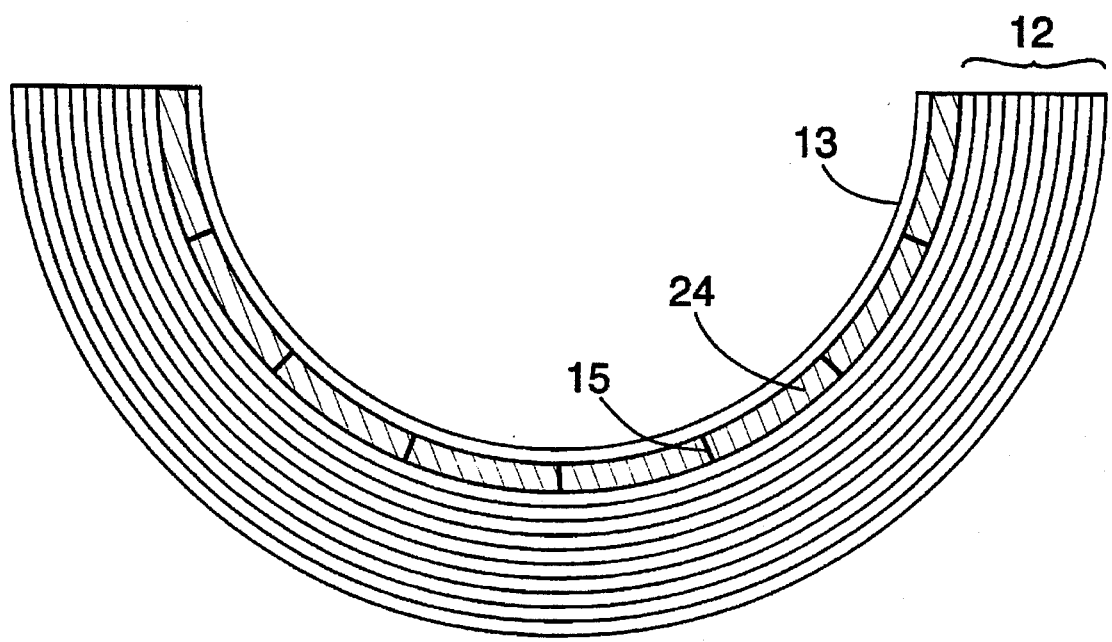
FIG. 3 is a cross section of a platelet assembly of the present invention after having undergone a forming process.

The benefits provided by the filler material extend to the forming operation as well, overcoming for example the problem illustrated in FIG. 2 to achieve the result shown in FIG. 3. The uppermost layer 13 is diffusion bonded to both the filler material 24 and the strips of platelet material 15 in the second platelet by a diffusion bond extending continuously along both. The bond restricts the response of the uppermost layer 13 to the compressive force encountered during the forming operation by maintaining the uppermost and second layers in full surface contact. The uppermost layer therefore compresses within its own boundaries without buckling or collapsing, and thereby maintains a smooth curvature in conformance with the remainder of the assembly.

Figure 4:
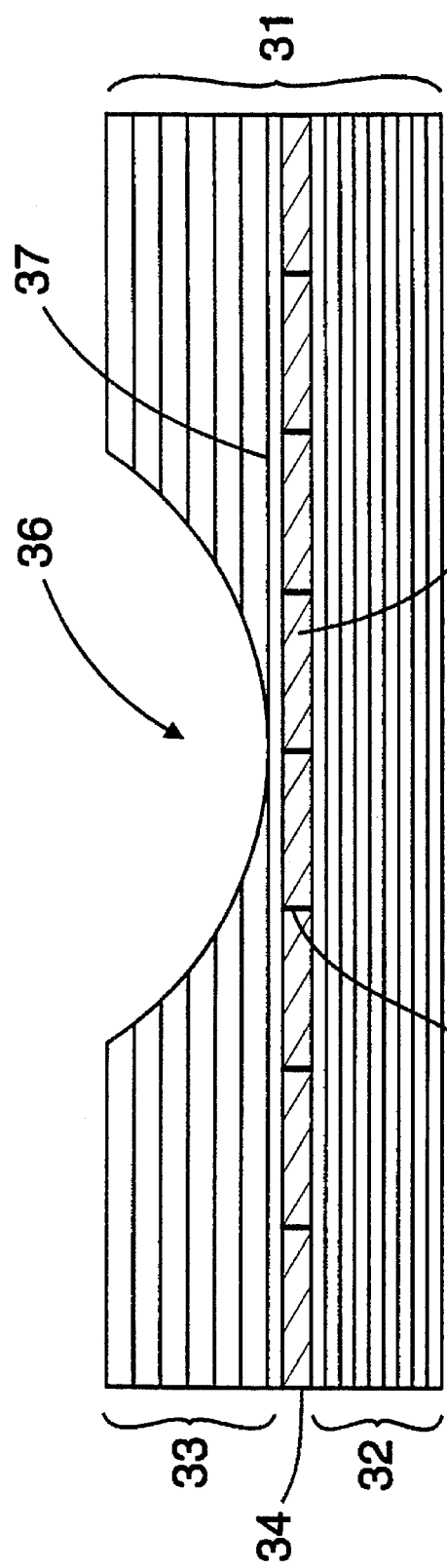
FIG. 4 is a cross section of a platelet assembly of the present invention after having undergone a machining process.

FIG. 4 illustrates a platelet assembly 31 after having been machined. The assembly is formed from two groups or subassemblies of continuous platelets 32, 33 with a discontinuous platelet 34 in between. The discontinuous platelet contains regularly spaced void regions between thin strips of platelet material 35, these void regions being identical to the void regions of the platelet assembly of FIG. 1. The machining operation involves the use of a cutting tool such as a lathe or drill bit applied to the upper surface of the assembly to remove portions of the upper platelet subassembly 33 and thereby form a recess 36 in the upper surface.

With no filler occupying the void region 35 immediately underneath the cutting region, the portion of the next higher platelet 37 which is immediately above the void region is unsupported and therefore vulnerable to the force of the cutting tool. This platelet 37 will easily undergo deformation from the action of the cutting tool, either by forming fissures or losing alignment and possibly impacting the platelets residing further underneath. Even with a filler present which is not diffusion bonded to the adjacent platelets, deformation of the platelet 37 above the filler will still occur, since the shear force exerted by the cutting tool will not be sufficiently resisted by the filler. The problem is solved by a filler 38 which is diffusion bonded to the adjacent platelet 37 in accordance with the invention. The filler supports the upper platelets both against collapse under the pressure of the cutting tool and against lateral distortion under the shear force exerted by the action of the tool.

Figure 5:
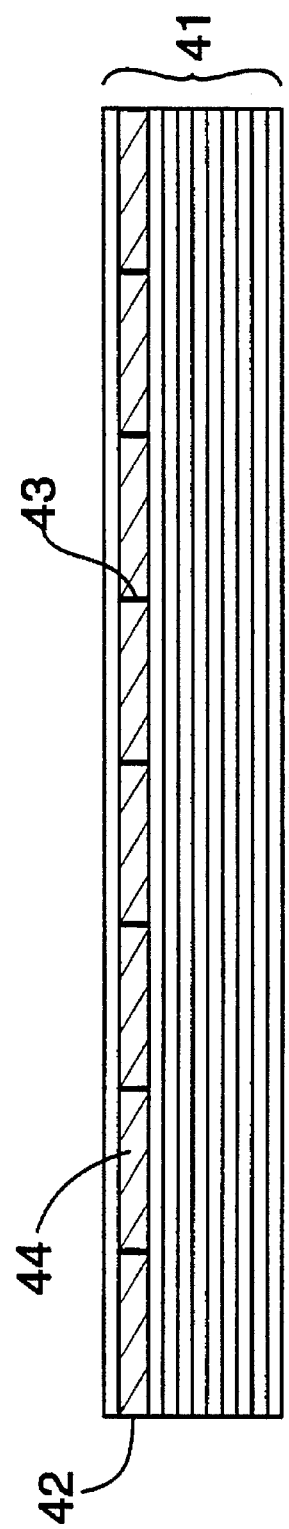
FIG. 5 is a cross section of a platelet assembly of the present invention on which welding is to be performed.

The problem of welding a platelet assembly over a void region is illustrated in FIG. 5. Here the platelet assembly 41 is identical to that of FIG. 1, with the second platelet 42 from the top containing void regions separated by thin strips 43 of platelet material. With no filler in the void regions, there is little or no dissipation of heat from the upper platelet 44 through the void region and into the remainder of the assembly when a welding operation is performed on the upper platelet. Welding on that platelet, particularly at a site 45 above a void region, would require close control of the welding temperature, and would limit the choice of welding techniques, to avoid destruction of the thin upper platelet, and the weld would be of limited strength since it entails only the top platelet. When filler material occupies the void regions, however, the filler material serves as a heat sink and conducts the heat to the lower platelets, thereby dissipating the heat from the welding site and achieving deeper penetration of the weld into the platelet assembly. An electron beam welding technique, for example, will produce a stronger weld joint with the filler in place, and techniques such as TIG (tungsten-inert-gas) welding which would otherwise be destructive of the assembly can be used with a reduced risk of damage. The filler can also serve as a barrier to the welding beam and thereby help prevent weld-induced contamination caused by blow-through.

Other post fabrication processes will also benefit from the inclusion of the diffusion-bonded filler material in the otherwise void spaces in the platelets. These include hot sizing and brazing. Still others will be readily apparent to those skilled in the platelet manufacturing and processing art.

Figure 6:
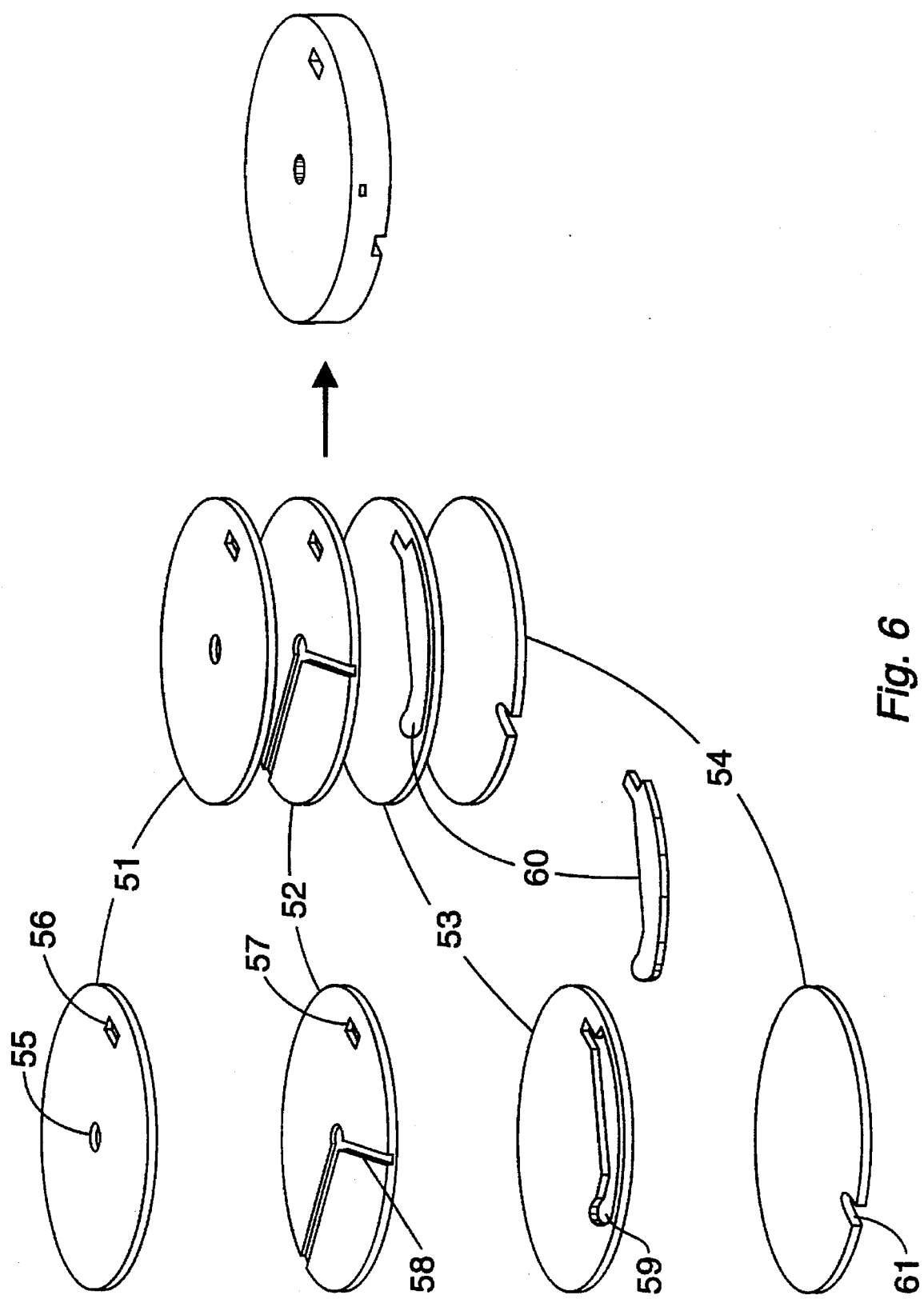
FIG. 6 is a perspective view of four platelets being combined into an assembly in accordance with the present invention.

FIG. 6 illustrates a platelet assembly where each of the platelets contains channels (depth-etched regions), holes (through-etched regions), or both. The platelets are positioned such than when they are arranged in an assembly, the channels or holes form continuous flow passages which open to the exterior of the assembly either at the edges of the assembly or at the top or bottom surface, or both. Four platelets 51, 52, 53, 54 are shown, the uppermost platelet 51 having two small holes 55, 56; the second from the top 52 having a small hole 57 and a narrow channel 58; the third from the top 53 having a wide, irregularly shaped hole 59; and the fourth a notch 60 at the edge. The holes and channel collectively form two independent flow paths through the platelet assembly, each of which is open at both ends. While each of the holes and the channel are potentially detrimental to the diffusion bonding of the underlying and overlying platelet regions, the wide hole 59 is of greatest concern due to its width and consequently the large area of the second platelet 52 which is left unsupported when the assembly is formed. Lateral transmission of the pressure applied during diffusion bonding is less effective in this region than in the regions above and below the small holes and narrow channel.

To remove the danger of insufficient bonding between the first and second platelets 51, 52 in the region above the wide hole 59, an insert 61 of filler material whose contours match those of the hole and whose thickness is equal to that of the third platelet 53 is placed in the hole, filling the hole completely while the platelets are being stacked. The assembly is then diffusion bonded, and there is no discontinuity in the strength of the diffusion bond between the first and second platelets 51, 52 above the insert 61. It will also be noted, however, that the small hole 57, the narrow channel 58 and the outer portion of the edge notch 60 are each small enough in width that adequate bonding of the platelets above and below these void regions will still occur, even without filler inserts being placed in these regions during the bonding process.

For each of the examples discussed above as well as others which will be readily apparent to those skilled in the art, the filler material will be removed from the assembly once diffusion bonding and any post-bonding fabrication is completed. To remove the filler material, the assembly is immersed in an etching or leaching solution. Since the void regions in the discontinuous platelets form passages which open either to the edges of the platelet or to one of the other of the two outer (top and bottom) platelets, the solution has full access to the filler material and the passages are opened undistorted. Alternatively, if the filler material melts at a temperature lower than the platelet material, the filler material can be removed by heating. As a still further alternative, heating of the filler material can be used to augment the removal of the filler material by etching or leaching.

The foregoing is offered primarily for purposes of illustration. It will be readily apparent to those skilled in the art that the operating conditions, materials, procedural steps and other parameters of the system described herein may be further modified or substituted in various ways without departing from the spirit and scope of the invention.

What is claimed is:

1. A method for manufacturing a nonplanar bonded platelet assembly which contains channels formed by void regions in at least one individual platelet, said method comprising:
    (a) arranging a plurality of platelets in a stack containing first and second platelets interleaved by an intermediate platelet, said intermediate platelet containing void regions, and with a solid metallic filler material occupying said void regions, said solid metallic filler material being one that remains solid upon exposure to said bonding conditions but is liquefiable under conditions in which said platelets remain solid;
    (b) subjecting said stack to said bonding conditions to produce an assembly of bonded platelets and metallic filler material; and
    (c) bending said assembly into a nonplanar shape, thereby applying an expansive force to said first platelet and a compressive force to said second platelet; and
    (d) selectively liquefying said metallic filler material relative to said bonded platelets and removing said metallic filler material thus liquified from said nonplanar shaped assembly.

2. A method in accordance with claim 1 in which said platelets are diffusion-bondable, said metallic filler material is diffusion-bondable to said platelets, said bonding conditions are diffusion bonding conditions, said metallic filler material is liquefiable by dissolving by a leaching or etching agent to which said platelets are inert, and step (d) comprises selectively leaching or etching said metallic filler material from said assembly.

3. A method for manufacturing a structural dement comprised of a bonded and machined platelet assembly which contains channels formed by void regions in individual platelets, said method comprising:
    (a) arranging said platelets in a stack with said void regions aligned to form said channels, and with a solid metallic filler material occupying said void regions, said solid metallic filler material being one that remains solid upon exposure to said bonding conditions but is liquefiable under conditions in which said platelets remain solid;
    (b) subjecting said stack to said bonding conditions to produce an assembly of bonded platelets and metallic filler material; and
    (c) machining said assembly at a location adjacent to regions of said metallic filler material to remove a portion of said assembly; and
    (d) selectively liquefying said metallic filler material relative to said bonded platelets and removing said metallic filler material thus liquified from said nonplanar shaped assembly.

4. A method in accordance with claim 3 in which said platelets are diffusion-bondable, said metallic filler material is diffusion-bondable to said platelets, said bonding conditions are diffusion bonding conditions, said metallic filler material is liquefiable by dissolving by a leaching or etching agent to which said platelets are inert, and step (d) comprises selectively leaching or etching said metallic filler material from said assembly.

5. A method for manufacturing a composite structural element comprised of a first member which is a bonded platelet assembly which contains channels formed by void regions in individual platelets and which is welded to a second member, said method comprising:
    (a) arranging said platelets in a stack with said void regions aligned to form said channels, and with a solid metallic filler material occupying said void regions, said solid metallic filler material being one that remains solid upon exposure to said bonding conditions but is liquefiable under conditions in which said platelets remain solid;
    (b) subjecting said stack to said bonding conditions to produce an assembly of bonded platelets and metallic filler material; and
    (c) welding said second member to said assembly at a location adjacent to regions of said metallic filler material; and
    (d) selectively liquefying said metallic filler material relative to said bonded platelets and removing said metallic filler material thus liquified from said nonplanar shaped assembly.

6. A method in accordance with claim 5 in which said platelets are diffusion-bondable, said metallic filler material is diffusion-bondable to said platelets, said bonding conditions are diffusion bonding conditions, said metallic filler material is liquefiable by dissolving by a leaching or etching agent to which said platelets are inert, and step (d) comprises selectively leaching or etching said metallic filler material from said assembly.

7. A method for the manufacture of an assembly of bonded platelets which are bondable to each other when subjected to bonding conditions, said assembly containing channels formed by void regions in said platelets, said method comprising:

(a) arranging said platelets in a stack with said void regions aligned to form said channels, and with a solid metallic filler material occupying said void regions, said solid metallic filler material being one that remains solid upon exposure to said bonding conditions but is liquefiable under conditions in which said platelets remain solid;

(b) subjecting said stack to said bonding conditions to produce an assembly of bonded platelets and metallic filler material; and (c) selectively liquefying said metallic filler material relative to said bonded platelets and removing said metallic filler material thus liquified from said assembly.

8. A method in accordance with claim 1 in which said platelets are diffusion-bondable, said metallic filler material is diffusion-bondable to said platelets, and said bonding conditions are diffusion bonding conditions.

9. A method in accordance with claim 1 in which said bonding conditions comprise compressing said platelets at a pressure of at least about 200 psi.

10. A method in accordance with claim 1 in which said bonding conditions comprise compressing said platelets at a pressure of from about 1000 psi to about 3000 psi.

11. A method in accordance with claim 1 in which said metallic filler material is liquefiable by dissolving by a leaching agent which does not leach said platelets, and step (c) comprises selectively leaching said metallic filler material from said assembly.

12. A method in accordance with claim 1 in which said metallic filler material is liquefiable by dissolving by an etching agent which does not etch said platelets, and step (c) comprises selectively etching said metallic filler material from said assembly.

13. A method in accordance with claim 1 in which said platelets are diffusion-bondable, laid metallic filler material is diffusion-bondable to said platelets, said bonding conditions are diffusion bonding conditions, said metallic filler material is liquefiable by dissolving by a leaching or etching agent to which said platelets are inert, and step (e) comprises selectively leaching or etching said metallic filler material from said assembly.

* * * * *